United States Patent Office 3,044,913
Patented July 17, 1962

3,044,913
UNSATURATED POLYESTER LAMINATE AND PROCESS FOR MAKING SAME
Lennart A. Lundberg, Stamford, Conn., assignor to American Cyanamid Company, New York, N.Y., a corporation of Maine
No Drawing. Filed May 27, 1958, Ser. No. 737,998
17 Claims. (Cl. 154—43)

This invention concerns an improved method for preparing plastic products from polymerizable compositions. More particularly, this invention relates to an improved process for preparing molded products from polymerizable resinous compositions which products are relatively devoid of crazing and cracking failures. Still more specifically, this present invention relates to a method of obtaining cured fiber-filled laminates having a plurality of unusual characteristics including freedom from crazing deficiencies, which comprises copolymerizing a polymerizable cyanurate and an ethylenically unsaturated polyester resin in the presence of a reaction-rate modifier including various amide compounds and subsequently post-curing the resultant polymer at elevated temperatures in the substantial absence of oxygen or air.

The copolymerization of a cyanurate containing alkenyl esterifying radicals with unsaturated polyester resins is disclosed in detail in U.S. Patent No. 2,510,503. Typical of the cyanurates disclosed therein are such as triallyl cyanurate, trimethallyl cyanurate, tricrotyl cyanurate and diallyl methallyl cyanurate. These copolymers have become of considerable importance in the molding art. One of the salient beneficial features of these polymerization products is that they may be cured to yield a complex resinous structure exhibiting a high degree of heat-resistance. The term heat-resistance in this connection refers to the characteristic of the cured resin to resist degradation in mechanical strength properties when subjected to prolonged exposure to elevated temperatures.

The monomer triallyl cyanurate is at present extensively used in compositions of this type where a high degree of heat-resistance of the cured product is required. It is known that in order to achieve optimum heat-resistance properties for compositions of this type, the copolymer after being copolymerized at a relatively low temperature initially, must be finally subjected to a curing cycle at elevated temperatures which is denominated in the art as post-curing. Almost invariably, polymeric compositions treated in this manner develop a fault which is referred to in the art as crazing or cracking. This cracking phenomenon may affect portions beneath the surface of the cured product but is particularly evident upon the surfaces thereof. While the use of conventional reinforcers such as glass fibers may possibly contribute to these cracking tendencies, nevertheless, such deficiencies are associated with the unfilled or unreinforced molded compositions.

I have found a method whereby the above-stated polymerizable compositions may be cured to their ultimate degree of hardness as evidenced by the compositions having a high degree of heat-resistance without the deleterious occurrence of crazing. My method for precluding the occurrence of crazing in compositions of this type constitutes the essence of the instant invention.

One of the objects of this invention is to provide an improved process for the preparation of cured resinous molding compositions.

Another object of this invention is to provide polymerized compositions which are capable of being cured to heat-resistant forms without the occurrence of cracking or crazing failures.

Still another object of this invention is to control the rate of polymerization of the reaction mixture so as to obtained cured products thereof having improved characteristics and properties.

A particular object of this invention is to provide a method for making heat-resistant, fiber reinforced polyester-triallyl cyanurate copolymer laminates which exhibit low water absorption, good mechanical stress properties and unusual resistance to cracking or crazing upon post-curing or exposure to temperatures of 500° F. for extended periods.

The most important use at present for the resinous compositions to which this invention relates is in the fabrication of plastic parts for aircraft, such as radomes, nose sections and the like. Usually, these fabrications are in the form of a laminate prepared by superimposing a number of glass fiber sheets impregnated with the polymerizable resinous mixture and then curing with or without pressure the composite by heat alone, or heat in combination with a polymerization catalyst. As mentioned previously, after the initial copolymerization has been effected, it is mandatory that the laminate be post-cured in a temperature range of 400° F. to 500° F. in order to achieve the necessary degree of mechanical strength properties and heat-resistance. While some degree of crazing may occur during the initial copolymerization step, the post-curing process accounts for most of the crazing characterizing a fully cured product.

It is known that the cracking or crazing of a laminate of this type results in the plastic being quite sensitive to moisture influences. Thus, crazed laminates when exposed to high humidity will absorb over 3% by weight of water with a resulting deleterious effect on certain electrical properties. The adverse effect on the electrical properties of the laminate cannot be tolerated in many use applications, particularly where the use is in aircraft assemblies. Prior to my invention there was no known satisfactory way of post-curing triallyl cyanurate copolymer resin, glass-reinforced laminates which effectively minimized the inherent crazing phenomenon associated with these compositions and the resultant serious deleterious properties caused by this phenomenon.

The present invention is based on my discovery that amido compounds, which designated class contemplates urea and N and/or N' substituted derivatives thereof, substituted derivatives of melamine, etc., when present in a polymerization mixture comprising an unsaturated cyanurate ester and an ethylenically unsaturated polyester resin will effectively modify the copolymerization rate in a desirable manner. This reaction modifying effect serves to minimize crazing tendencies which appear to be directly related to excessive exothermic behaviors of the polymerizing mixture.

Another important adjunct of this present novel polymerization process is that if the initial polymerization product is post-cured at elevated temperatures in a manner whereby precaution is taken to exclude any substantial amount of air being in contact with the object, a craze-free post-cured products is readily obtainable.

Both of the steps outlined directly hereinabove are necessary in order to achieve a properly cured fiber reinforced laminate showing substantially no amount of crazing. In other words, the use of my reaction modifier alone, without the observance of excluding air during the post-curing step, will not yield desirable results. Conversely, the omission of the use of my reaction-rate modifier and the observance of preventing air to contact the laminate during the post-cure cycle will also not result in obtaining laminates free of crazing defects.

The manner in which my polymerization reaction modifiers perform in reducing crazing tendencies is not fully understood at present. It has been noted that small amounts of these modifiers reduce the maximum exotherm temperature reached during the copolymerization reaction and it is reasoned from this that the reaction rate or mechanism is fundamentally affected. Such being the case, I am of the opinion that stresses and strains are minimized and equalized during the polymerization reaction, so that they will not manifest themselves as cracking in the copolymer. No plausible reason is evident why the presence of these reaction-rate modifiers and the exclusion of air during the post-curing cycle must concomitantly be observed in order to prevent this crazing phenomenon. It is only known that the laminate must have been initially polymerized in the presence of these modifiers; that they must be present during the post-curing cycle and additionally, the post-curing composition must be shielded from contact with air.

The unsaturated polyester resins that may be used in the practice of this invention directed to the production of craze-free laminates are produced by the esterification of an unsaturated alpha, beta polycarboxylic acid of the aliphatic series, with an aliphatic polyhydric alcohol and particularly a glycol. However, reactive resins suitable for copolymerizing with the various unsaturated cyanuric acid esters are those containing a plurality of polymerizable reactive alpha, beta enal groups. Thus, and this is common practice, one may employ a combination of saturated acids or those free of alpha, beta unsaturation with the alpha, beta unsaturated dicarboxylic acids.

The unsaturated alpha, beta polycarboxylic acids of the aliphatic series which may be employed in this manner to prepare the reactive resins include maleic, fumaric, itaconic, aconitic, citraconic, mesaconic and the like. These unsaturated acids should be present in an amount approximating at least 20% by weight of the total weight of the polycarboxylic acids used, and preferably, in amounts varying between 25 and 65% by weight based on the total weight of the polycarboxylic acid present. Examples of saturated polycarboxylic acids that may be used in combination with the alpha, beta ethylenically unsaturated acids mentioned above include oxalic, malonic, succinic, glutaric, sebacic, adipic, pimelic, suberic, azelaic, tricarballylic, citric, tartaric and malic. Acids such as phthalic which contain no non-benzenoid unsaturation may be used in a manner as the above-mentioned acids are used. Whenever available, the anhydrides of these acids, and the alpha, beta-ethylenically unsaturated acids may be used, e.g., maleic anhydride, phthalic anhydride, succinic anhydride, and the like. Also, mixtures of the acids and/or anhydrides may be used in the preparation of the unsaturated polyester resin.

The preferred polyhydric alcohols are those which contain only primary hydroxyl groups, simply because the presence of secondary hydroxyl groups may make it difficult to obtain rapid esterification with a polycarboxylic acid. The glycols are especially preferable.

The particular choice of glycol or other polyhydric alcohols used in preparing the resin is governed mainly by the physical properties desired of the intermediate and final polymerization products, especially hardness, impact resistance, distensibility properties and the like.

Among the glycols that may be employed to prepare the polymerizable unsaturated polyester resins are ethylene glycol, diethylene glycol, propylene glycol, dipropylene glycol, triethylene glycol, tetraethylene glycol, butanediol-1,2, butanediol-1,3, butanediol-1,4, pentanediol-1,2, pentanediol-1,4, pentanediol-1,5, hexanediol-1,6, and the like. Polyhydric alcohols having more than two hydroxyl groups which may be employed are such as glycerol, trimethylolethane, trimethylolpropane, pentaerythritol, dipentaerythritol, sorbitol, anitol, adonite, dulcitol, arabitol, xylitol, etc. It is usually desirable that a dihydric alcohol be employed in major proportion relative to any alcohols containing more than two hydroxy groups which may be used in forming the polyester.

In the preparation of the reactive unsaturated polyesters, it is usually desirable that a polyhydric alcohol and preferably a dihydric alcohol be employed in an amount which represents at least a theoretical or equivalent of the hydroxyl groups to that represented by the acids used. However, it is preferred that an excess of polyhydric alcohol approximately 10 or 15% above the stoichiometric quantity required for a substantially complete esterification of the acid or acids employed. Where a polyhydric alcohol containing more than two hydroxy groups or a polycarboxylic acid having more than two carboxyl groups are used, it becomes more important that the proportion of reactants should be adjusted so that the molar amount of hydroxyl groups exceeds that of the carboxyl groups. Generally an excess of 15% (equivalent basis) is satisfactory in allowing a polyester to be obtained which does not contain any substantial amount of cross-linking.

The polyhydric alcohol and the polycarboxylic acid or the various mixtures of each that may be employed should be reacted sufficiently to produce an ultimate polyester resinous material having an acid number preferably not greater than 55. A suitable acid number range for resins of this type is from about 35 to about 40. In polyesters of this type, it is generally preferred that the acid number should be as low as possible, but this is sometimes altered or controlled by practical considerations of operations such as time, temperature and economy. The determination of acid number is a means for determining the amount of condensation or esterification that has occurred. This control means comprises ascertaining the milligrams of potassium hydroxide required to neutralize one gram of the resinous condensate.

The temperature at which the polycarboxylic acid and the polyhydric alcohol are reacted is not critical. When the esterification is carried out at atmospheric pressure, the optimum temperature is generally just below the boiling point of the most volatile component of the reaction mixture which is generally the glycol employed. The low volatility of some of the polycarboxylic acids or anhydrides that may be used has no effect upon the stated optimum temperatures to be employed, because a polycarboxylic acid readily forms half-esters at comparatively low temperatures and consequently does not exist as an acid per se at the preferred higher esterification temperatures. Also, temperatures in excess of the boiling point of the lowest boiling glycol constituent employed may be used if care is taken to provide the reaction vessel with an air condenser. Such a device permits the water of esterification to escape from the reaction mixture while volatilized glycols will be condensed therein and returned to the reaction mixture.

Since these unsaturated polyester compositions are prone to develop color when in contact with air at elevated temperature, it is generally good practice to conduct the esterification reaction under an inert gaseous atmosphere such as obtained by bubbling a gas such as carbon dioxide or nitrogen through the esterifying mixture. Further details pertaining to the preparation of these unsaturated polyester resins are disclosed in Ellis Patent No. 2,255,313 and Kropa Patents Nos. 2,443,735 and 2,443,741, inclusive, which are incorporated herein by reference.

The polymerizable monomeric cross-linking materials that may be used to prepare the heat-resistant compositions to which this invention is directed include the various unsaturated cyanurates and isocyanurates. Unquestionably, at the present time the compound triallyl cyanurate is the most important ester of this type. However, this is so because it is readily available and in addition relatively inexpensive. Numerous other unsaturated esters of this type may nevertheless be used. Triallyl isocyanurate has also become an important raw material for the preparation of these heat-resistant resinous compositions. In order to obtain optimum degree of heat-resistance in the cured composition, it is generally considered that all of the esterifying radicals of the cyanuric acid or isocyanuric acid esters should be alkenyl. However, esters containing only one alkenyl substituent and wherein the other two esterifying radicals are alkyl radicals may be advantageously employed. Obviously, esters of this type containing two alkenyl and one alkyl esterifying radicals may be used. These mono and dialkenyl substituted triazine esters are especially advantageously used in combination with the trialkenyl substituted esters particularly where the final properties desired in the cured products are propitiously affected by the presence of minor amounts of these lesser unsaturated esters. With this in mind, illustrative examples of the unsaturated triazine esters that are suitable as the cross-linking component in preparing the heat-resistant compositions of this invention are: triallyl cyanurate, trimethallyl cyanurate, tricrotyl cyanurate, diallyl methallyl cyanurate, dimethallyl allyl cyanurate, diallylcrotyl cyanurate, dicrotylmethallyl cyanurate, diallylmethoxy cyanurate, diallylethoxy cyanurate, diallylpropoxy cyanurate, dimethallylmethoxy cyanurate, dicrotylmethoxy cyanurate, allyldimethoxy cyanurate, methallyldiethoxy cyanurate, allylmethoxypropoxy cyanurate, and the like. Additionally, one may use isocyanurates corresponding to the cyanurates specifically mentioned hereinabove.

While it is contemplated that the major portion of the cross-linking polymerizable ester should be one or a mixture of the abovementioned types of cyanuric or isocyanuric acid esters, nevertheless, other polymerizable monomers are not precluded from being used in minor amounts to obtain the heat-resistant resinous compositions to which this invention is directed. My method of obviating crazing in these types of cured resinous compositions is, therefore, advantageously employed where there is a sufficient quantity of the unsaturated cyanurates or isocyanurates which tend to develop the characteristic crazing of these compositions, particularly during the post-curing cycle. Therefore, other polymerizable materials may be used in conjunction with the cyanurates or isocyanurates mentioned above. These include such compounds as styrene, acrylonitrile, diallylphthalate, triallyltrimesate, trimethallyl trimesate, tricrotyl trimesate, diallylmethallyl trimesate, triallyl citrate, diallyl hexachloroendomethylenetetrahydrophthalate, diallyltetrachlorophthalate, and the like.

The ratio of the reactive polyester resin and the monomeric cross-linking agent used to prepare the thermosetting resinous compositions of this invention may be varied over a wide range. The unsaturated polyester content may, therefore, range from about 10 to about 90% of the total weight of the copolymerizable mixture. For the majority of the purposes, however, the active polymerizable components comprise from about 40 to about 60 parts by weight of the unsaturated polyester resin and correspondingly from about 60 to 40 parts of the polymerizable monomer. In order to meet the stringent requirements called for where the use might be for aircraft application, it has been found that an equal mixture of the unsaturated polyester resin and the polymerizable monomer is desirable. The compounding of the various polymerizable reactants may be accomplished by merely mixing the unsaturated polyester with the monomer material to form a homogeneous solution of these components.

In order to facilitate the copolymerization of the monomeric materials with the unsaturated polyester resin, it is preferred that this coreaction be accelerated by incorporating a polymerization catalyst into the polymerizable composition. Suitable polymerization catalysts include the organic super oxides, alcoholic and acetic peroxides. Among the preferred catalysts there are: the acidic peroxides, e.g., benzoyl peroxide, phthalic peroxide, octoyl peroxide, succinic peroxide and benzyl acetyl peroxide; alcohol peroxides, e.g., tertiary butyl hydroperoxide, cumene hydroperoxide and terpene oxides, e.g., ascaridole. Still other polymerization catalysts might be used in some instances, e.g., aluminum chloride, stannic chloride, boron trifluoride and azo type catalysts such as azodibutyronitrile.

The concentration of catalysts employed is usually small, i.e., for the preferred catalyst, from about 1 part catalyst per 1000 parts of the mixture of materials to be polymerized to about 2 parts per 100 parts of said mixture. If an inhibitor be present, up to 5% or even more by weight of the catalyst, based on the weight of the polymerizable composition, may be necessary depending on the concentration and inhibiting capacity of the inhibitor employed.

As inferred, a polymerizable inhibitor may be advantageously employed in the compositions of this invention. Because these compositions are potentially subject to polymerization, even in the absence of a catalyst, it is often desirable to incorporate a polymerization inhibitor so as to assure that the polymerizable mixture will have a reasonable degree of shelf-life at room temperature. The polymerization inhibitors generally employed do not materially affect the polymerization mechanism once it is initiated. One skilled in the art can readily appropriate a suitable inhibitor or determine an amount of an inhibitor to stabilize the composition during storage and wherein such inhibitor will not affect the mode of polymerization when subsequently initiated. Suitable inhibitors for this purpose are phenolic compounds, especially the polyhydric phenols, and aromatic amines. Specific examples of this group of inhibitors are hydroquinone, sym. di-(beta-naphthyl)-p-phenylene diamine, phenolic resins, sulfur compounds, etc. The concentration of the inhibitor is preferably low, and less than about 1% is usually sufficient. However, with the preferred inhibitors, e.g., polyhydric phenols and aromatic amines, it is preferred to use only about 0.01 to about 0.1%. The inhibitor is generally incorporated into the composition at the time when the reactive polyester resin is dissolved in the monomeric cross-linking agent. However, an inhibitor such as hydroquinone may be advantageously present during the preparation of the unsaturated polyester resin.

Where the purpose of using the thermosetting resinous compositions of this invention is to prepare moldings, a filler, as well known in the art may be employed. The amount of filler employed will depend upon the ultimate use of the molding composition and property sought and, therefore, may vary over a wide range up to as high as 80% by weight, based on the total weight of the final molding composition. Illustrative examples of fillers that may be incorporated into the molding composition are such as alpha cellulose, wood flour, fibrous or powder asbestos, yarn cuttings, finely divided silicone carbide, carbon black, diatomaceous earth, slate dust, powdered or flaked mica, cloth cuttings (e.g., silk, rayon, wool, linen, cotton, nylon or cloth made from glass fibers or from polymeric or copolymeric acrylonitrile fibers, etc.), ground cork, silica, etc. Preferably, the amount of filler based on the total weight of the molding composition is in the order of about 30%–60% by weight. For certain applications, no filler need be present.

When the object is to prepare laminates or reinforced molding compositions with the resinous compositions to which this invention is directed, the conventional-art known techniques may be employed. A conventional method consists of impregnating the reinforcing cloth with the polymerizable mixture containing a catalyst. Various layers of these impregnated cloths are then superimposed upon each other in sufficient number so as to give a desired thickness and then the composite cured. The resin content of such a laminate is generally in the order of from about 30% to 60%, based on the total weight of the composite assembly. Laminates of this type may be converted into various structural forms during the copolymerization reaction by conventional molding techniques, or by post-forming of the laminate after the resinous composition comprising same has been initially copolymerized. Various types of cloth may be used to prepare reinforced laminates. These include silk, rayon, wool, linen, cotton, nylon cloth or cloth made from glass fibers or from polymeric or copolymeric acrylonitrile fibers, etc. Glass fiber cloths are preferred in making laminates which are to be used to fabricate aircraft parts. This is so because of the extreme chemical inertness of the glass fiber composition and because of its complete non-hydrophilic characteristics.

An essential component, in accordance with this invention, of the copolymerizable composition is an effective amount of what I term a copolymerization reaction-rate modifier. As mentioned hereinabove, a broad class of amide type compounds have been found to be effective reaction-rate modifiers in that minor amounts of these compounds when present in a polymerizing mixture of an ethylenically unsaturated polyester and a trialkenyl cyanurate markedly reduce the peak exotherms normally associated with such polymerizing compositions. The board class of amides found to be useful in this manner include beside the amides of a carboxylic acid, the so-called amino compounds such as substituted ureas and melamine. While melamine displays weakly basic characteristics, nevertheless, because of its molecular structure it is generally regarded in the art as being an amide. As set forth hereinabove, I do not understand the mechanism whereby these modifiers affect the thermal behavior of the polymerizing mixture. However, I believe that an amide group, which group is common to my various effective modifiers, is responsible for the moderating effect upon the polymerization reactions to which this invention relates. It has also been observed that the more compatible the modifier is with the polymerizing mixture the more efficient is its effect in obviating excessive exotherm behaviors. Therefore, certain of the substituted ureas and melamine are preferred because of their superior compatibility characteristics. Some of the various suitable reaction-rate modifiers that may be used in accordance with this invention contain polymerizable substituent groups. It is to be understood that this ability of a particular reaction-rate modifier to polymerize or copolymerize with other components has no import with regard to the basic concept of this invention. In other words, the potentially polymerizable reaction-rate modifiers are used herein exclusively to beneficially affect the thermal behavior of the polymerizable compositions of this invention and the amounts of such modifiers required to achieve this effect, as limited by the instant claims, are regarded as insignificant in altering the basic composition of the resinous formulations to which this invention is directed. An enumeration of suitable modifiers for the purpose of this invention includes such as: urea, propyl urea, butyl urea, N,N-diallyl urea, N,N'-diallyl urea, ammelide, ammeline, N,N-diallyl melamine, triaryl melamines, e.g., triphenyl melamine; alkyl guanamines, e.g., acetoguanamine; aryl guanamines, e.g., benzoguanamine; beta acetoxy propionamide, beta-alloxy-N-tert-butyl propionamide, lactamide, succinamide, adipamide, phthalamide, salicylamide.

An effective amount of the reaction-rate modifier has been found to range from about 1.0% to 5% based on the total weight of the reaction mixture. Preferably, from about 1% to about 3% of the compatible amides is employed. These reaction-rate modifiers may be incorporated into the resinous composition at any time prior to the addition of catalysts.

The curing of the polyester resin-cyanuric acid ester compositions may be accomplished with or without pressure. They may be cured at atmospheric pressure or at pressures in excess of atmospheric during the initial stage of the polymerization. In this stage, it is believed that the principal reaction is that between two of the alkenyl groups of the cyanurate or isocyanurate molecule and the reactive resin component. During this initial curing stage, I prefer that some means be taken to shield the composition from the air. Temperatures for the initial polymerization reaction may range from about 10° C. up to 150° C. Preferably it is desirable to form the copolymers by heating the catalyzed resin forming mass to between about 100° C. and 110° C. for a period of about 10 to 90 minutes. No appreciable exotherm occurs during this stage with glass reinforced laminates up to ½″ in thickness. It is not until the laminate is heated to 400° F. to complete the cure that a secondary exotherm may develop. If the laminate is heated to 500° F. too rapidly, the copolymerization may lead to an uncontrollable exotherm with charring and frequently burning results. The final laminate after completing the cure at 500° F. is dark brown in color.

I believe that the excessive temperatures that are prematurely reached as a result of the secondary exotherm are a definite factor in inducing the tendency for these particular types of resinous compositions to craze.

It has been noted that where my reaction-rate modifiers are used in polymerization reactions of this type, the peak or secondary exotherm temperature reached is significantly lower than that obtained in those compositions containing no reaction-rate modifier. Thus where a typical composition may exhibit a peak exotherm temperature of 200 to 250° C., the presence of 1% of a reaction-rate modifier, specifically N,N-diallyl urea, will result a peak exotherm in the order of about 180° C.

After the initial copolymerization reaction has taken place, it is necessary to post-cure the composition in order to obtain a product having a degree of heat-resistance potentially inherent in compositions of this type. Temperatures in the order of 450° F. are required to achieve this. The time required for post-curing the composition will in a large measure depend upon the nature of the reactive polyester resin employed in the composition and upon the particular type of unsaturated cyanuric acid ester used as the cross-linking agent. Generally, the post-curing cycle is maintained for an extended period, ranging from about 2 to 5 hours. It is during this post-curing that another important aspect of my invention is to be observed. I have found that it is essential that the object be shielded from any substantial contact with air during this post-curing cycle. Even though the reaction-rate modifier is used in the initial copolymerization reaction, it is not sufficient in allowing one to secure a post-cured product free of crazing if the object is not protected from the air during heating at elevated temperatures.

Any number of suitable means may be employed to substantially exclude air from contacting the object during the post-curing cycle. One way is to place the laminate or molded object between metal platens. Another way is to apply a cellophane, or similar type of film to the surface of the molded object during the initial copolymerization reaction and allow this film to remain attached to the object during the post-curing cycle. Fortunately, it is not necessary that the protective film be in intimate contact with the molded object during the post-curing period. Depositing the molded object into a bag made of cellophane, polyethylene and the like, will effectively exclude air from contact with the surface of the object and thus a craze-free post-cured plastic is readily obtained. This manner of protecting the plastic object is particularly desirable when one is attempting to post-cure contour structural forms.

Still another suitable method for protecting the plastic object during the post-curing stage wherein heat-resistance is developed, consists of coating the surface of said object with a silicone grease or other like high temperature resistant coatings capable of being readily removed from the surface of the plastic.

In order that those skilled in the art may better understand how the present invention may be practiced, the following examples are given. These examples are set forth primarily for the purpose of illustration and any specific enumeration of details contained therein should not be interpreted as a limitation on the case except as indicated in the appended claims. All parts specified are parts by weight unless indicated otherwise.

EXAMPLE 1

Into a suitable reaction vessel equipped with a stirrer, thermometer, inlet means for introducing nitrogen gas beneath the surface of the reaction mixture, were charged 116 parts of maleic anhydride and 68 parts of ethylene glycol. The reaction vessel was vented through an air cooled reflux condenser. The reaction mixture was gradually heated to 200° C. with stirring and with a slow stream of nitrogen introduced beneath the reaction mixture surface. Heating was continued at this temperature until an acid number of 35 was obtained. The resin was cooled to approximately 60° C. whereupon it was discharged from the reaction vessel to a suitable container. Upon determination of the yield of solid resin, an equal portion of triallyl cynaurate was added to the fluid polyester composition and homogeneously mixed therewith. Hydroquinone as an inhibitor in the amount of 0.01% based upon the monomer and polyester combination was added.

In order to illustrate the effect of small amounts of carbamide and substituted carbamides upon the copolymerization reaction between an unsaturated polyester and triallyl cyanurate, 5 gram samples of the above poly glycol-maleate-triallyl cyanurate resin were charged to standard-length test tubes having a 19 mm. diameter. Each sample was catalyzed with two percent Luperco ATC equi-parts of benzoyl peroxide and tricresyl phosphate). To one of the samples no reaction-rate modifier or stabilizer was added. This served as a control. To the others were added various amounts of N,N'-diallyl urea, N,N-diallyl urea and urea in amounts ranging from 0.5 to 5% based on the sample weight. A copper-constantan thermocouple was inserted into each of the samples and the heat or temperature developed within the polymerizing sample was observed by an electronic temperature recorder. The test tube was immersed into an oil bath at 90° C., immediately subsequent to the addition of the catalyst. The internal temperature of the polymerizable mixture was constantly recorded and the pertinent critical temperature data obtained in this testing are as indicated in the following table:

Table I

| Stabilizing Agent | | Peak Exotherm Characteristics | |
|---|---|---|---|
| Type | Amount | Primary, ° C. | Secondary, ° C. |
| None | | 230 | [1] >250. |
| N,N'-diallyl urea | 0.5 | 192 | 210. |
| Do | 1.0 | 178 | no sec. exotherm |
| N,N-diallyl urea | 1.0 | 167 | Do. |
| Do | 5.0 | 167 | Do. |
| Urea | 1.0 | 185 | [1] >250. |
| Do | 2.0 | 190 | no sec. exotherm. |

[1] Resin charred.

The above data serve to show the moderating effect of the ureas upon the copolymerization reaction. The exothermic behavior of the copolymerization reaction between triallyl cyanurate and an unsaturated polyester resin is such wherein two distinct modes of behavior are observable. In the first stage an exotherm develops which appears to reach a peak and then level off, but after a brief pause in temperature leveling off, the temperature again rapidly rises. Where no stabilizing agent is employed, or where an ineffective amount of urea is employed, the temperature of the reaction mixture rises above 250° C. which causes charring of the reaction mixture. Thus, it can be seen from the data given above that where N,N'-diallyl urea, N,N-diallyl urea and effective amounts of urea are employed, the peak primary exotherm is held down to within an acceptable temperature range and, more important, no secondary exotherm is evident in compositions modified in this manner.

Ordinarily, in the practice of making laminates, while there is a secondary exotherm, the peak temperature reached in such applications do not ordinarily cause charring of the resinous material. This is so because the ordinary laminates are relatively thin and consequently the exotherm can be satisfactorily dissipated and furthermore, since the resinous content of such laminates is usually in the order of about 40%, the effect of the secondary exotherm is minimized. Nevertheless, in industrial practice directed to the preparation of laminates, the exothermic characteristics of the reacted ingredients are experienced and extreme care must be taken that this heat is properly dissipated or else charring will result. While it is believed that the control of the exotherm characteristics of triallyl cyanurate copolymers in accordance with this invention is a factor in the securing of craze-free laminates, nevertheless, apart from this consideration, it can be appreciated the value of modifying such reaction mixtures in accordance with this invention merely to reduce peak exothermic temperatures incurred in the prior art practice and thus conveniently preclude any deleterious effects associated with this exothermic behavior.

EXAMPLE 2

This example primarily illustrates the effect of excluding air when curing a glass reinforced triallyl cyanurate copolymer laminate during the post-curing of the laminate in order to develop the heat-resistance thereof.

In this example the glass fiber used as the reinforcer was 181-136 type cloth, conforming to the specification MIL-F-9084, which is usually employed for reinforcing structural aircraft plastic components. The glass fabric was cut into 18" by 19" pieces and laid up so that all plies were parallel. Twelve plies of the 181 glass cloth were used which gave flat test panels, nominally ⅛" thick. The lay-up was laid on a large sheet of cellophane laid over a metal caul plate. The impregnating resin was then poured on the center of the cloth and spread out with a spatula. The cellophane was then folded over the lay-up and a caul plate was laid on top. The resin was allowed to soak into the fabric for 15 minutes, so that the glass fabric was thoroughly impregnated.

After the soaking period, the top plate was removed and the excess resin and trapped air were worked out by wiping with a rigid, flat piece of plastic over the cellophane surface. The laminate was then cured between aluminum caul plates in a hydraulic press equipped with steam-heated platens. The laminate was placed in the press and a pressure of approximately 15 p.s.i. was applied. The final resin content of the laminates prepared in this manner ranged from about 34 to 36%. In this series of test laminates, the resin binder or impregnant employed was that of Example 1 catalyzed with 2% Luperco ATC (50% benzoyl peroxide-50% tricresyl phosphate). In one of the test laminates, the resinous impregnant contained no stabilizing agent. The other test laminates in this series contained the resin modified with 1% of N,N'-diallyl urea.

After the laminates had been inserted in the press, the platen temperature was raised from room temperature to a temperature ranging from 170° to 220° F. in thirty minutes. The laminates were cured for one hour at this temperature, following which curing cycle the laminates were cooled to room temperature. For the post-curing of these laminates, a cycle of one hour at 400° F. and three hours at 500° F. was observed. The various ways in which the laminates were shielded from contact with air during the post-curing stage are indicated in the following table.

*Table II*

| Stabilizing Agent | Laminate Appearance after Press Cure | Treatment of Laminate following Press Cure | Appearance of Laminate after Post Cure Cycle |
|---|---|---|---|
| None | Extreme surface crazing. | Cellophane covering retained | Extreme surface crazing. |
| 1% N,N' - Diallyl Urea | No crazing | Cellophane covering removed | Extensive crazing. |
| Do | ----do---- | Cellophane covering removed; laminate retained between metal platens during post-cure cycle. | No crazing—smooth surface |
| Do | ----do---- | Cellophane covering retained | Do. |
| Do | ----do---- | Cellophane covering removed and laminate enclosed in cellophane bag. | Do. |

The data in the above Table II illustrate that a degree of precaution in excluding air from contacting the laminate is to be observed during the post-curing cycle if a craze-free product is to be obtained. The above example also shows that a critical degree of exclusion is not necessary since the laminate, obtaining an effective amount of stabilizer, when enclosed in a cellophane bag does not develop crazing. Additionally, it is to be noted from the above example that the mere use of stabilizing agent without observing the precaution of not allowing air to freely contact the laminate during the post-curing cycle will result in a specimen exhibiting crazing.

EXAMPLE 3

This example illustrates an effective and different mode for protecting the laminate from the deleterious effect of air during the post-curing cycle. A test specimen of laminate is prepared in an identical manner as employed in Example 2. The resinous binder employed was that of Example 1 containing 1% of N,N'-diallyl urea as the reaction-rate modifier. The polymerizable reaction mixture was catalyzed with 2% Luperco ATC and copolymerized according to the method used in preparing the samples of Example 2. Following the co-reaction period, the sample was removed from the press and the cellophane covering was entirely removed. At this stage, the entire surface of the laminate evidenced no visible cracks, but possessed a fairly shiny smooth surface. Thereupon, one-half of the laminate surface was coated with silicone grease. This test specimen was then post-cured, employing a curing cycle of one hour at 400° F. followed by an additional three hours at 500° F. Upon cooling to room temperature, the silicone grease coating was removed by washing with a hydrocarbon solvent in which the silicone grease was partially soluble. The surface portion of the laminate which was covered with the silicone grease during the post-curing stage possessed a few isolated cracks, whereas, the untreated section was opaque and badly crazed.

EXAMPLE 4

A laminate assembly was prepared in an identical manner to that employed in Example 2. The stabilizing agent or reaction-rate modifier used was 1% of N,N-diallyl urea. Instead of the cellophane covering employed in preparing the laminates of Example 2, a Mylar film was substituted therefor. Following the initial coreaction cycle which was the same in this instance as employed in Example 2, the laminate was then post-cured with the Mylar film left intact. After the post-curing cycle of one hour at 400° F. and three hours at 500° F., the laminate upon cooling to room temperature was stripped of its protective film. The heat-resistant laminate obtained in this example possessed a very smooth surface and no crazing was evident.

EXAMPLE 5

This example illustrates that laminates prepared in accordance with this invention are not adversely affected with regard to the mechanical properties of the post-cure composition. One-eighth inch laminates were prepared in the manner described in Example 2. One of the laminates contained a binder which employed no stabilizing agent and the resultant laminate served as a control in this test. The other two laminates contained N,N-diallyl urea in the amounts of 1 and 5%, based on the polymerizable reaction mixture. The laminates were copolymerized according to the method described in Example 2. Following the initial polymerization reaction, the cellophane covering of each laminate was removed and each of the laminates was inserted between metal platens and post-cured at 400° F. for one hour followed by an additional three hours at 500° F. The laminates were cooled to room temperature, whereupon, the flexural strength of all specimens were determined according to federal specifications LP–406b, Amendment 1, Method 1031.1. The size of the test specimens for determining the flexural strength was approximately ⅛" x 1" x 4". After this initial determination of the flexural strength of the post-cured laminates, the laminates were heated at 500° F., consisting of one-half hour at 500° F. and 192 hours at said temperature. The flexural strength values obtained in accordance with this testing pattern and the water absorption characteristics of the laminates following the 192-hour aging at 500° F. are indicated in the following table.

*Table III*

| Reaction-Rate Modifier | Laminate Appearance after Post-Curing | Flexural Strength—p.s.i. | | | Water Absorption,[1] Percent |
|---|---|---|---|---|---|
| | | At 25° C. | At 500° F. after 5 hrs. at 500° F. | At 500° F. after 192 hrs. at 500° F. | |
| None | Rough surface; badly crazed. | 59,500 | 39,900 | 19,400 | 2.8 |
| 1% N,N-Diallyl Urea | Smooth surface; no visual cracks. | 58,900 | 37,800 | 17,700 | 2.5 |
| 5% N,N-Diallyl Urea | ----do---- | 58,300 | 35,600 | 20,900 | 1.6 |

[1] ASTM Method D570–54T.

The data shown in the above table indicate that the flexural strength properties of the modified post-cured laminates is in the same order as that obtained for the control containing no modifier. Also, these data show that the degree of heat-resistance, as measured by the flexural strength property, of the modified laminates is approximately in the order of that obtained for a laminate composite containing no reaction-rate modifier. Additionally, it is shown in the above table that the water absorption characteristic of the aged samples containing the diallyl urea as modifier shows an improvement over the control laminate composite.

EXAMPLE 6

Into a suitable reaction vessel equipped with a stirrer, thermometer and inert gas leg, were charged 229 parts of neopentyl glycol and 232 parts of fumaric acid. This mixture was gradually heated, with stirring, to 200°C. As soon as the reaction mixture is readily stirrable, a stream of $CO_2$ is passed through the reaction mixture. Heating was continued until an acid number of 40 was obtained. The resin was then cooled to approximately 60°C. and thereupon discharged from the reaction vessel. To the polyester resin was added a quantity of trimethallyl cyanurate so as to result in a copolymerizable mixture containing 60% reactive polyester resin and 40% of the cross-linking monomer. The reaction mixture was then catalyzed with 1% di-t-butyl peroxide. To the mixture was added 3 parts of urea per 100 parts of the copolymerizable mixture and incorporated therein by stirring. A 1/8" laminate was prepared using nylon cloth as the reinforcing component. The method in preparing the laminate was substantially that employed in preparing the glass fiber reinforced laminates described in Example 2. A cellophane protective film was employed in preparing the laminate. The uncured assembly was press-cycled at 110°C. for one hour. The laminate was then post-cured in a manner previously described. After the post-curing process, the cellophane wrapper was removed from the laminate and the surface thereof was shiny and smooth and no perceptible cracking or crazing was observed. The laminate prepared in accordance with this example is an excellent base for electrical contacting equipment.

EXAMPLE 7

Into a suitable reaction vessel equipped as in Example 6, were charged 196 parts of maleic anhydride, 148 parts of phthalic anhydride and 254 parts of propylene glycol. An air-cooled condenser was attached to the reaction vessel and the mixture heated with stirring until a temperature of 195° was obtained. This temperature was maintained until an acid number of 35 was obtained. Hydroquinone in the amount of .015% of the original charge, was then added and dissolved in the polyester resin. The resin was cooled to approximately 60°C. and the recation vessel discharged of its contents. The yield of solid polyester resin amounted to 500 parts, to which were added 370 parts of triallyl cyanurate. The homogeneous solution was then accomplished by stirring. When the polyester resin-triallyl cyanurate composition had cooled to room temperature, 125 parts of acrylonitrile were blended into this composition. N,N-diallyl urea in the amount of 1% based on the total weight of the polymerizable mixture was added and dissolved therein. To the polyester resin composition was added 1% methyl ethyl ketone peroxide and 8 parts per million cobalt as cobalt naphthenate, each based on total solids. A lightweight canvas duck fabric was impregnated with this catalyzed syrup and the excess of resinous material was removed by passing the impregnated duck between loosely set rolls. Multiple layers of the impregnated fabric were then laminated to 1/8" thickness. A cellophane covering was used to enclose the laminate. The laminate was cured in a press employing a temperature of 110°C. for one hour. The tripolymer reinforced laminate was then post-cured for four hours at 475°F. The post-cured product showed excellent surface characteristics and there was no visual evidence of crazing.

EXAMPLE 8

Example 1 was repeated in every detail except that in place of the particular urea type reaction-rate modifier used therein, various other types of modifiers were employed in lieu thereof. Pertinent test data obtained in this experiment are listed in the following Table IV.

Table IV

| Stabilizing Agent | | Peak Exotherm Characteristics | |
|---|---|---|---|
| Type | Amount, percent | Peak Temp. °C. | Time to Peak Temp. |
| None | | >250 | 4'10" |
| N,N-diallyl melamine | 2 | 170 | 5'34" |
| β-Acetoxy propionamide | 2 | 205 | 5'37" |
| Triphenyl melamine* | 2 | 174 | 13'18" |
| Benzoguanamine* | 2 | 173 | 5'20" |
| Succinamide* | 2 | 167 | 5'00" |
| s-diphenyl urea | 2 | 171 | 8'40" |
| Adipamide | 2 | 185 | 6'25" |
| β-alloxy-N-tert.-butyl propionamide* | 2 | 168 | 5'10" |
| Lactamide* | 2 | 170 | 6'25" |
| Salicylamide* | 2 | 155 | 5'40" |

The resinous compositions of Table IV identified with an asterisk were used to prepare laminates in a manner as shown in Example 2. In curing the laminates a cellophane film covering was used during the initial cure and retained during the post-curing operation. The same curing cycle as employed in Example 2 was utilized. It was observed that each post-cured laminate of the instant example possessed a substantially craze-free surface.

I claim:

1. A process for the preparation of a heat-resistant laminated article which comprises (A) impregnating a plurality of fibrous sheets with a termosetting polyester resinous composition comprising (1) an ethylenically unsaturated polyester resin, obtained by esterifying a saturated dihydric alcohol, with an α,β-ethylenically unsaturated dicarboxylic acid, (2) a monomeric cross-linking agent for said (1) selected from the group consisting of triallyl cyanurate and triallyl isocyanurate, (3) from about 1% to 5% by weight, based on the weight of said (1) and said (2), of an amide compound selected from the group consisting of urea, alkyl ureas, aryl ureas, N,N-diallyl urea, N,N'-diallyl urea, ammelide, ammeline, melamine, N,N-diallyl melamine, triaryl melamines, alkyl guanamines, aryl guanamines, β-acetoxy propionamide, β-alloxy-N-tert-butyl propionamide, lactamide, succinamide, adipamide, phthalamide and salicylamide, wherein said alkyl and aryl substituents are unsubstituted alkyl and aryl groups, and (4) a catalytic amount of an addition polymerization catalyst, (B) consolidating a superimposed assembly of said impregnated fibrous sheets at a temperature of from about 10° C. to about 150° C. for from about 10 to 90 minutes, and thereupon (C) post-curing the consolidated assembly at a temperature above about 400° F. for at least about 2 hours while substantially shielding said assembly from contact with air.

2. A process for the preparation of a heat-resistant laminated article which comprises (A) impregnating a plurality of fibrous sheets with a thermosetting polyester resinous composition comprising (1) an ethylenically unsaturated polyester resin, obtained by esterifying a saturated dihydric alcohol with an α,β-ethylenically unsaturated dicarboxylic acid, (2) a monomeric cross-linking agent for said (1) selected from the group consisting of triallyl cyanurate and triallyl isocyanurate, (3) from about 1% to 5% by weight, based on the weight of said (1) and said (2), of N,N-diallyl urea, and (4) a catalytic amount of an addition polymerization catalyst, (B) consolidating a super-imposed assembly of said impregnated fibrous sheets at a temperature of from about 10° C. to about 150° C. for from about 10 to 90 minutes, and thereupon (C) post-curing the consolidated assembly at a temperature above about 400° F. for at least about 2 hours while substantially shielding said assembly from contact with air.

3. A process for the preparation of a heat-resistant laminated article which comprises (A) impregnating a plurality of fibrous sheets with a thermosetting polyester resinous composition comprising (1) an ethylenically unsaturated polyester resin, obtained by esterifying a saturated dihydric alcohol with an $\alpha,\beta$-ethylenically unsaturated dicarboxylic acid, (2) a monomeric cross-linking agent for said (1) selected from the group consisting of triallyl cyanurate and triallyl isocyanurate, (3) from about 1% to 5% by weight, based on the weight of said (1) and said (2), of triphenyl melamine, and (4) a catalytic amount of an addition polymerization catalyst, (B) consolidating a super-imposed assembly of said impregnated fibrous sheets at a temperature of from about 10° C. to about 150° C. for from about 10 to 90 minutes, and thereupon (C) post-curing the consolidated assembly at a temperature above about 400° F. for at least about 2 hours while substantially shielding said assembly from contact with air.

4. A process for the preparation of a heat-resistant laminated article which comprises (A) impregnating a plurality of fibrous sheets with a thermosetting polyester resinous composition comprising (1) an ethylenically unsaturated polyester resin, obtained by esterifying a saturated dihydric alcohol with an $\alpha,\beta$-ethylenically unsaturated dicarborylic acid, (2) a monomeric cross-linking agent for said (1) selected from the group consisting of triallyl cyanurate and triallyl isocyanurate, (3) from about 1% to 5% by weight, based on the weight of said (1) and said (2), of $\beta$-alloxy-N-tert-butyl propionamide, and (4) a catalytic amount of an addition polymerization catalyst, (B) consolidating a super-imposed assembly of said impregnated fibrous sheets at a temperature of from about 10° C. to about 150° C. for from about 10 to 90 minutes, and thereupon (C) post-curing the consolidated assembly at a temperature above about 400° F. for at least about 2 hours while substantially shielding said assembly from contact with air.

5. A process for the preparation of a heat-resistant laminated article which comprises (A) impregnating a plurality of fibrous sheets with a thermosetting polyester resinous composition comprising (1) an ethylenically unsaturated polyester resin, obtained by esterifying a saturated dihydric alcohol with an $\alpha,\beta$-ethylenically unsaturated dicarboxylic acid, (2) a monomeric cross-linking agent for said (1) selected from the group consisting of triallyl cyanurate and triallyl isocyanurate, (3) from about 1% to 5% by weight, based on the weight of said (1) and said (2), of succinimide, and (4) a catalytic amount of an addition polymerization catalyst, (B) consolidating a super-imposed assembly of said impregnated fibrous sheets at a temperature of from about 10° C. to about 150° C. for from about 10 to 90 minutes, and thereupon (C) post-curing the consolidated assembly at a temperature above about 400° F. for at least about 2 hours while substantially shielding said assembly from contact with air.

6. A process for the preparation of a heat-resistant laminated article which comprises (A) impregnating a plurality of fibrous sheets with a thermosetting polyester resinous composition comprising (1) an ethylenically unsaturated polyester resin, obtained by esterifying a saturated dihydric alcohol with an $\alpha,\beta$-ethylenically unsaturated dicarboxylic acid, (2) a monomeric cross-linking agent for said (1) selected from the group consisting of triallyl cyanurate and triallyl isocyanurate, (3) from about 1% to 5% by weight, based on the weight of said (1) and said (2), of benzoguanamine, and (4) a catalytic amount of an addition polymerization catalyst, (B) consolidating a super-imposed assembly of said impregnated fibrous sheets at a temperature of from about 10° C. to about 150° C. for from about 10 to 90 minutes, and thereupon (C) post-curing the consolidated assembly at a temperature above about 400° F. for at least about 2 hours while substantially shielding said assembly from contact with air.

7. A process for the preparation of a heat-resistant laminated article which comprises (A) impregnating a plurality of glass fiber sheets with a thermosetting polyester resinous composition comprising (1) an ethylenically unsaturated polyester resin, obtained by esterifying a saturated dihydric alcohol with an $\alpha,\beta$-ethylenically unsaturated dicarboxylic acid, (2) triallyl cyanurate, (3) from about 1% to 5% by weight, based on the weight of said (1) and said (2), of N,N-diallyl urea, and (4) a catalytic amount of an addition polymerization catalyst, (B) consolidating a super-imposed assembly of said impregnated glass fiber sheets at a temperature of from about 10° C. to about 150° C. for from about 10 to 90 minutes, and thereupon (C) post-curing the consolidated assembly at a temperature above about 400° F. for at least about 2 hours while substantially shielding said assembly from contact with air.

8. A process for the preparation of a heat-resistant laminated article which comprises (A) impregnating a plurality of glass fiber sheets with a thermosetting polyester resinous composition comprising (1) an ethylenically unsaturated polyester resin, obtained by esterifying a saturated dihydric alcohol with an $\alpha,\beta$-ethylenically unsaturated dicarboxylic acid, (2) triallyl cyanurate, (3) from about 1% to 5% by weight, based on the weight of said (1) and said (2), of triphenyl melamine, and (4) a catalytic amount of an addition polymerization catalyst, (B) consolidating a super-imposed assembly of said impregnated glass fiber sheets at a temperature of from about 10° C. to about 150° C. for from about 10 to 90 minutes, and thereupon (C) post-curing the consolidated assembly at a temperature above about 400° F. for at least about 2 hours while substantially shielding said assembly from contact with air.

9. A process for the preparation of a heat-resistant laminated article which comprises (A) impregnating a plurality of glass fiber sheets with a thermosetting polyester resinous composition comprising (1) an ethylenically unsaturated polyester resin, obtained by esterifying a saturated dihydric alcohol with an $\alpha,\beta$-ethylenically unsaturated dicarboxylic acid, (2) triallyl cyanurate, (3) from about 1% to 5% by weight, based on the weight of said (1) and said (2), of $\beta$-alloxy-N-tert-butyl propionamide, and (4) a catalytic amount of an addition polymerization catalyst, (B) consolidating a super-imposed assembly of said impregnated glass fiber sheets at a temperature of from about 10° C. to about 150° C. for from about 10 to 90 minutes, and thereupon (C) post-curing the consolidated assembly at a temperature above about 400° F. for at least about 2 hours while substantially shielding said assembly from contact with air.

10. A process for the preparation of a heat-resistant laminated article which comprises (A) impregnating a plurality of glass fiber sheets with a thermosetting polyester resinous composition comprising (1) an ethylenically unsaturated polyester resin, obtained by esterifying a saturated dihydric alcohol with an $\alpha,\beta$-ethylenically unsaturated dicarboxylic acid, (2) triallyl cyanurate, (3) from about 1% to 5% by weight, based on the weight of said (1) and said (2), of succinimide, and (4) a catalytic amount of an addition polymerization catalyst, (B) consolidating a super-imposed assembly of said impregnated glass fiber sheets at a temperature of from about 10° C. to about 150° C. for from about 10 to 90 minutes, and thereupon (C) post-curing the consolidated assembly at a temperature above about 400° F. for at least about 2 hours while substantially shielding said assembly from contact with air.

11. A process for the preparation of a heat-resistant laminated article which comprises (A) impregnating a plurality of glass fiber sheets with a thermosetting polyester resinous composition comprising (1) an ethylenically unsaturated polyester resin, obtained by esterifying a saturated dihydric alcohol with an α,β-ethylenically unsaturated dicarboxylic acid, (2) triallyl cyanurate, (3) from about 1% to 5% by weight, based on the weight of said (1) and said (2), of benzoguanamine, and (4) a catalytic amount of an addition polymerization catalyst, (B) consolidating a super-imposed assembly of said impregnated glass fiber sheets at a temperature of from about 10° C. to about 150° C. for from about 10 to 90 minutes, and thereupon (C) post-curing the consolidated assembly at a temperature above about 400° F. for at least about 2 hours while substantially shielding said assembly from contact with air.

12. A heat-resistant laminated article which comprises a consolidated, post-cured assembly of a plurality of super-imposed thermoset polyester resin-impregnated fibrous sheets, said thermoset polyester resin being, in an uncured state, a thermosetting polyester resinous composition comprising (1) an ethylenically unsaturated polyester resin, obtained by esterifying a saturated dihydric alcohol with an α,β-ethylenically unsaturated dicarboxylic acid, (2) a monomeric cross-linking agent for said (1) selected from the group consisting of triallyl cyanurate and triallyl isocyanurate, (3) from about 1% to 5% by weight, based on the weight of said (1) and said (2), of an amide compound selected from the group consisting of urea, alkyl ureas, aryl ureas, N,N-diallyl urea, N,N'-diallyl urea, ammelide, ammeline, melamine, N,N-diallyl melamine, triaryl melamines, alkyl guanamines, aryl guanamines, β-acetoxy propionamide, β-alloxy-N-tert-butyl propionamide, lactamide, succinamide, adipamide, phthalamide and salicylamide, wherein said alkyl and aryl substituents are unsubstituted alkyl and aryl groups, and (4) a catalytic amount of an addition polymerization catalyst, said assembly having been consolidated at a temperature of from about 10° C. to about 150° C. for from about 10 to 90 minutes and thereupon post-cured at a temperature above about 400° F. for at least about 2 hours while being substantially shielded from contact with air.

13. A heat-resistant laminated article which comprises a consolidated, post-cured assembly of a plurality of super-imposed thermoset polyester resin-impregnated fibrous sheets, said thermoset polyester resin being, in an uncured state, a thermosetting polyester resinous composition comprising (1) an ethylenically unsaturated polyester resin, obtained by esterifying a saturated dihydric alcohol with an α,β-ethylenically unsaturated dicarboxylic acid, (2) a monomeric cross-linking agent for said (1) selected from the group consisting of triallyl cyanurate and triallyl isocyanurate, (3) from about 1% to 5% by weight, based on the weight of said (1) and said (2), of N,N-diallyl urea, and (4) a catalytic amount of an addition polymerization catalyst, said assembly having been consolidated at a temperature of from about 10° C. to about 150° C. for from about 10 to 90 minutes and thereupon post-cured at a temperature above about 400° F. for at least about 2 hours while being substantially shielded from contact with air.

14. A heat-resistant laminated article which comprises a consolidated, post-cured assembly of a plurality of super-imposed thermoset polyester resin-impregnated fibrous sheets, said thermoset polyester resin being, in an uncured state, a thermosetting polyester resinous composition comprising (1) an ethylenically unsaturated polyester resin, obtained by esterifying a saturated dihydric alcohol with an α,β-ethylenically unsaturated dicarboxylic acid, (2) a monomeric cross-linking agent for said (1) selected from the group consisting of triallyl cyanurate and triallyl isocyanurate, (3) from about 1% to 5% by weight, based on the weight of said (1) and said (2), of triphenyl melamine, and (4) a catalytic amount of an addition polymerization catalyst, said assembly having been consolidated at a temperature of from about 10° C. to about 150° C. for from about 10 to 90 minutes and thereupon post-cured at a temperature above about 400° F. for at least about 2 hours while being substantially shielded from contact with air.

15. A heat-resistant laminated article which comprises a consolidated, post-cured assembly of a plurality of super-imposed thermoset polyester resin-impregnated fibrous sheets, said thermoset polyester resin being, in an uncured state, a thermosetting polyester resinous composition comprising (1) an ethylenically unsaturated polyester resin, obtained by esterifying a saturated dihydric alcohol with an α,β-ethylenically unsaturated dicarboxylic acid, (2) a monomeric cross-linking agent for said (1) selected from the group consisting of triallyl cyanurate and triallyl isocyanurate, (3) from about 1% to 5% by weight, based on the weight of said (1) and said (2), of β-alloxy-N-tert-butyl propionamide, and (4) a catalytic amount of an addition polymerization catalyst, said assembly having been consolidated at a temperature of from about 10° C. to about 150° C. for from about 10 to 90 minutes and thereupon post-cured at a temperature above about 400° F. for at least about 2 hours while being substantially shielded from contact with air.

16. A heat-resistant laminated article which comprises a consolidated, post-cured assembly of a plurality of super-imposed thermoset polyester resin-impregnated fibrous sheets, said thermoset polyester resin being, in an uncured state, a thermosetting polyester resinous composition comprising (1) an ethylenically unsaturated polyester resin, obtained by esterifying a saturated dihydric alcohol with an α,β-ethylenically unsaturated dicarboxylic acid, (2) a monomeric cross-linking agent for said (1) selected from the group consisting of triallyl cyanurate and triallyl isocyanurate, (3) from about 1% to 5% by weight, based on the weight of said (1) and said (2), of succinimide, and (4) a catalytic amount of an addition polymerizatoin catalyst, said assembly having been consolidated at a temperature of from about 10° C. to about 150° C. for from about 10 to 90 minutes and thereupon post-cured at a temperature above about 400° F. for at least about 2 hours while being substantially shielded from contact with air.

17. A heat-resistant laminated article which comprises a consolidated, post-cured assembly of a plurality of super-imposed thermoset polyester resin-impregnated fibrous sheets, said thermoset polyester resin being, in an uncured state, a thermosetting polyester resinous composition comprising (1) an ethylenically unsaturated polyester resin, obtained by esterifying a saturated dihydric alcohol with an α,β-ethylenically unsaturated dicarboxylic acid, (2) a monomeric cross-linking agent for said (1) selected from the group consisting of triallyl cyanurate and triallyl isocyanurate, (3) from about 1% to 5% by weight, based on the weight of said (1) and said (2), of benzoguanamine, and (4) a catalytic amount of an addition polymerization catalyst, said assembly having been consolidated at a temperature of from about 10° C. to about 150° C. for from about 10 to 90 minutes and thereupon post-cured at a temperature above about 400° F. for at least about 2 hours while being substantially shielded from contact with air.

References Cited in the file of this patent

UNITED STATES PATENTS

| | | |
|---|---|---|
| 2,510,503 | Kropa | June 6, 1950 |
| 2,517,698 | Muskat | Aug. 8, 1950 |
| 2,635,089 | Anderson | Apr. 14, 1953 |
| 2,757,160 | Anderson | July 31, 1956 |
| 2,777,829 | Andrews et al. | Jan. 17, 1957 |
| 2,822,343 | Day et al. | Feb. 4, 1958 |
| 2,822,345 | Duhnkrack | Feb. 4, 1958 |
| 2,824,080 | Haux | Feb. 18, 1958 |

UNITED STATES PATENT OFFICE
CERTIFICATE OF CORRECTION

Patent No. 3,044,913                  July 17, 1962

Lennart A. Lundberg

It is hereby certified that error appears in the above numbered patent requiring correction and that the said Letters Patent should read as corrected below.

Column 2, line 2, for "obtained" read -- obtain --; column 7, line 20, for "board" read -- broad --; column 14, line 33, for "termosetting" read -- thermosetting --; column 15, line 26, for "dicarborylic" read -- dicarboxylic --.

Signed and sealed this 7th day of April 1964

(SEAL)
Attest:

ERNEST W. SWIDER
Attesting Officer

EDWARD J. BRENNER
Commissioner of Patents